United States Patent
Morales et al.

(12) United States Patent (10) Patent No.: US 8,107,115 B2
Morales et al. (45) Date of Patent: Jan. 31, 2012

(54) METHOD AND SYSTEM FOR QUEUE SYNCHRONIZATION

(75) Inventors: Javier A. Morales, Irondequoit, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1032 days.

(21) Appl. No.: 11/212,723

(22) Filed: Aug. 29, 2005

(65) Prior Publication Data

US 2007/0046994 A1 Mar. 1, 2007

(51) Int. Cl.
*G06K 15/00* (2006.01)

(52) U.S. Cl. ........ 358/1.16; 358/1.15; 709/223; 709/245

(58) Field of Classification Search ................. 358/1.16, 358/1.15; 709/223, 245
See application file for complete search history.

(56) References Cited

U.S. PATENT DOCUMENTS

| | | | |
|---|---|---|---|
| 4,947,345 A * | 8/1990 | Paradise et al. | 358/442 |
| 5,559,933 A * | 9/1996 | Boswell | 358/1.15 |
| 5,923,826 A * | 7/1999 | Grzenda et al. | 358/1.15 |
| 5,995,721 A * | 11/1999 | Rourke et al. | 358/1.15 |
| 6,075,615 A * | 6/2000 | Nakamura | 358/1.14 |
| 6,288,790 B1 * | 9/2001 | Yellepeddy et al. | 358/1.15 |
| 6,604,148 B1 * | 8/2003 | Dennison | 709/245 |
| 6,606,162 B1 * | 8/2003 | Simpson | 358/1.15 |
| 6,788,429 B1 * | 9/2004 | Clough et al. | 358/1.15 |
| 6,920,506 B2 * | 7/2005 | Barnard et al. | 709/245 |
| 6,999,185 B1 * | 2/2006 | Salgado | 358/1.12 |
| 7,184,157 B2 * | 2/2007 | Dennison et al. | 358/1.15 |
| 2002/0002557 A1 * | 1/2002 | Straube et al. | 707/103 Z |
| 2002/0080402 A1 * | 6/2002 | Robinson et al. | 358/1.15 |
| 2002/0174201 A1 * | 11/2002 | Ramer et al. | 709/220 |
| 2003/0005097 A1 * | 1/2003 | Barnard et al. | 709/223 |
| 2003/0090708 A1 * | 5/2003 | Dennison et al. | 358/1.15 |
| 2005/0086384 A1 * | 4/2005 | Ernst | 709/248 |
| 2005/0213115 A1 * | 9/2005 | Johnson et al. | 358/1.1 |
| 2006/0146360 A1 * | 7/2006 | Simonds et al. | 358/1.15 |
| 2006/0271927 A1 | 11/2006 | Morales et al. | |

* cited by examiner

*Primary Examiner* — King Poon
*Assistant Examiner* — Jacky X Zheng
(74) *Attorney, Agent, or Firm* — MH2 Technology Law Group LLP (57) ABSTRACT

This invention relates to a methods and a printing system in which queues across one or more printing devices, such as printers, copiers, and the like, are automatically kept synchronized. The queues are placed into one or more pools. In some embodiments, one queue in a pool is designated as a master queue. Changes to the queues in the pool are then controlled and propagated from the master queue. In other embodiments, various queues in a pool are designated as peers. Any change to a queue, such as a change to a subset of print job parameters, in the pool is then propagated to its peers.

6 Claims, 6 Drawing Sheets

METHOD AND SYSTEM FOR QUEUE SYNCHRONIZATION

FIELD

This invention relates generally to printing. More particularly, embodiments relates to a method and system for queue synchronization.

BACKGROUND

Network printing systems can now handle a variety of types and number of simultaneous print jobs. Because a printer can only process one print job at a time, each printer uses a print queue to hold other print jobs while printing a current print job. For example, a printer may comprise a memory that it uses as a print queue. Typically, network printing systems employ one or more print servers to feed the print jobs to the printers.

In addition to providing temporary storage, printer queues also provide job flow control and automated assignment of job processing instructions and job attributes. Examples of flow are controls on the ability to accept additional jobs into the queue and controls on the release of jobs already in the queue. Examples of automatic assignment of job processing instructions include assignment of default values for unspecified instructions and overriding existing values. Examples of job attributes include job name, job sender name, and processing priority. The number of job processing instructions and job attributes can be large.

Unfortunately, it can be difficult to manage multiple print queues, especially when the printers of the printing system are based on different platforms, software, and/or hardware. For example, the queue settings between different print queues may vary greatly in regard to duplex printing, color printing, print quality settings, and the like.

Printing systems and management software are well known in the art. The known systems and software often includes features for centrally establishing and managing print queues for printers of a network printing system. Cloning of printers is one technique that can establish identical printer queues on multiple devices, but cloning does nothing to ensure continued equivalence of printer queues.

Unfortunately, the known systems and software have difficulty synchronizing print queues effectively. This is because it is not uncommon for network printing systems to have to support multiple operating systems, different hardware platforms, different print drivers, etc. Many of the printers in a network printing system will produce different outputs for the same print job. Therefore, conventional network printing systems are often incapable of ensuring that a pool of printers will output print jobs identically across different printers.

For example, if a print job on one printer fails, then many network printing systems will attempt to redirect that print job (and the other print jobs for that printer) to another printer. However, because of the differences between printers, the redirected print job will likely not result in the same output if it were processed by the original printer. As another example, a print job may be quite large and the network printing system may spread the print job across multiple printers. Ideally, the output from each of these printers would be identical. Therefore, it may be desirable for a network printing system to ensure that print jobs are output identically across different printers.

Accordingly, it may be desirable to manage multiple print queues of a network printing system. It may also be desirable to synchronize multiple queues. These queues may be implemented in a single printing device or across multiple printing devices so that print jobs can be output identically in a network printing system.

SUMMARY OF THE INVENTION

In accordance with one feature of the invention, a method of synchronizing print queues is provided. A change to a first queue is detected. A queue pool for the first queue is determined and at least one additional queue in the queue pool is identified. The change is then propagated to the at least one additional queue.

In accordance with another feature of the invention, a printing system comprises a set of print queues configured to queue print jobs of the printing system. At least one processor is configured to synchronize the set of print queues such that print jobs of one print queue can be equivalently redirected to another print queue in the set of print queues. A set of printing devices is coupled to at least one of the set of print queues and configured to output the print jobs.

In accordance with another feature of the invention, a method of configuring a set of print queues in a printing system is provided. A set of print queues available in the printing system is identified. A pool of print queues from the identified set of print queues is selected. Each print queue in the selected pool is configured with an equivalent set of queue settings and each print queue in the selected pool are coupled with each other such that changes to the queue settings are propagated to each print queue in the selected pool.

Additional features of some embodiments of the invention will be set forth in part in the description which follows, and in part will be obvious from the description, or may be learned by practice of the invention. The features of some embodiments of the invention can be realized and attained by the elements and combinations set forth in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate some embodiments of the invention and together with the description, may serve to explain the principles of the invention.

DESCRIPTION OF THE EMBODIMENTS

Embodiments of the present invention provides a printing system in which queues across one or more printing devices, such as printers, copiers, and the like, are automatically kept synchronized. A printing device may be associated with one or more queues that are synchronized with each other. Alternatively, multiple printing devices may be associated with one or more queues in various configurations, such as one-to-many, many-to-one, and many-to-many. The queues are placed into one or more pools. In some embodiments, one queue in a pool is designated as a master queue. Changes to the queues in the pool, such as changes to various subsets of print job parameters, are then controlled and propagated from the master queue. In other embodiments, various queues in a pool are designated as peers. Any change to a queue in the pool is then propagated to its peers. A user may be able to create, edit, or delete pools of queue pools, for example, using software running on a workstation, computer, a printing device, etc.

However, one of ordinary skill in the art would readily recognize that the same principles are equally applicable to, and can be implemented in, all types of printing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Reference will now be made in detail to some embodiments of the invention, which are illustrated in the accompanying drawings. Wherever possible, the same reference numbers will be used throughout the drawings to refer to the same or like parts. For simplicity and illustrative purposes, the principles of the present invention are described by referring mainly to exemplary embodiments thereof.

Figure 1:
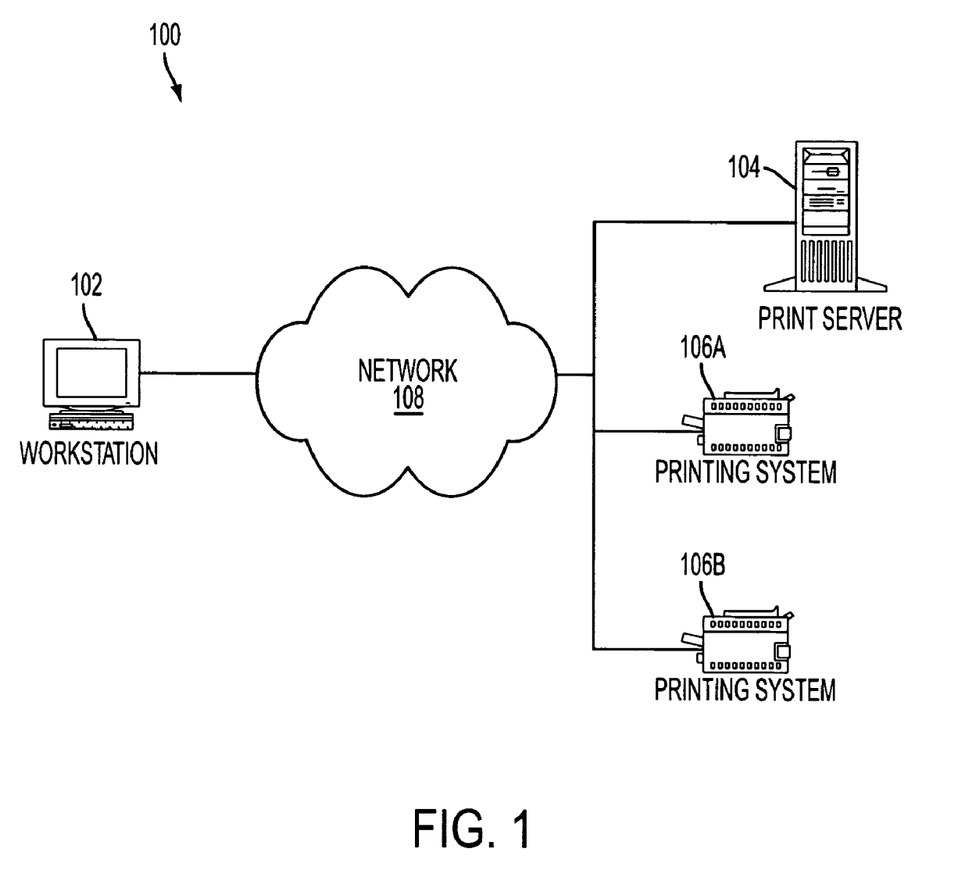
FIG. 1 illustrates an exemplary system that is in accordance with embodiments of the present invention.

FIG. 1 illustrates an exemplary system 100 that is in accordance with embodiments of the present invention. As shown, system 100 may comprise one or more workstations 102, a print server 104, printing systems 106A-C, and a network 108. These components will now be further described.

Workstation 102 may be any computer, such as a general purpose computer, which may implement embodiments of the present invention. Workstation 102 may have installed a number of software products including an operating system, applications, drivers, utilities and the like. A user of workstation 102 may thus submit one or more print jobs. In addition, workstation 102 may run program code that allows a user to configure one or more print queues of printers in system 100. In particular, workstation 102 may run program code that is written in a variety of programming languages, such as C, C++, JAVA, etc. Although FIG. 1 illustrates one workstation, one skilled in the art will recognize that system 100 may comprise any number of workstations or computers. The components that may be included in workstation 102 are described with reference to FIG. 2.

One skilled in the art will also recognize that embodiments of the present invention may be applied to any device that can submit a print job. Examples of such devices also include personal computers, servers, handheld devices, and their known equivalents.

Print server 104 controls one or more printers of system 100, such as printing system 106A-C. Print server 104 may be implemented in a variety of fashions. For example, as shown in FIG. 1, print server 104 may be implemented as a computer, such as a file server with print services or a dedicated print server. Print server 104 may also be implemented as part of the network operating system of system 100 or as an add-on utility. In addition, printer server 104 may be implemented as a plug-in card of printing system 106A, 106B or 106C. Such cards are well known to those skilled in the art.

In some embodiments, print server 104 receives the print jobs requested in system 100 and submits them to the print queues of printing systems 106A-C. Print server 104 may use the memory of printing systems 106A-C as print queues. Of course, print server 104 may also spool one or more print jobs as a background process as needed.

Printing systems 106A-C may be any system or device that is capable of printing a print job. For example, printing systems 106A-C may be a laser printer, an ink jet printer, a xerographic printing device, or copying device. Of course, printing systems 106A-C may support a variety of printing features and print job parameters, such as duplex printing, color printing, etc. Such printing systems are well known to those skilled in the art, such as the printing systems manufactured by Canon Corporation, the Hewlett Packard Company and the Xerox Corporation. One skilled in the art will also recognize that system 100 may include any number of printing systems as part of its network printing system.

Network 108 provides a communication infrastructure for system 100. Network 108 may be implemented based on known topologies and components. For example, network 108 may be implemented based on one or more local area network, such as an Ethernet network, a wide area network, the Internet, or the like.

Figure 2:
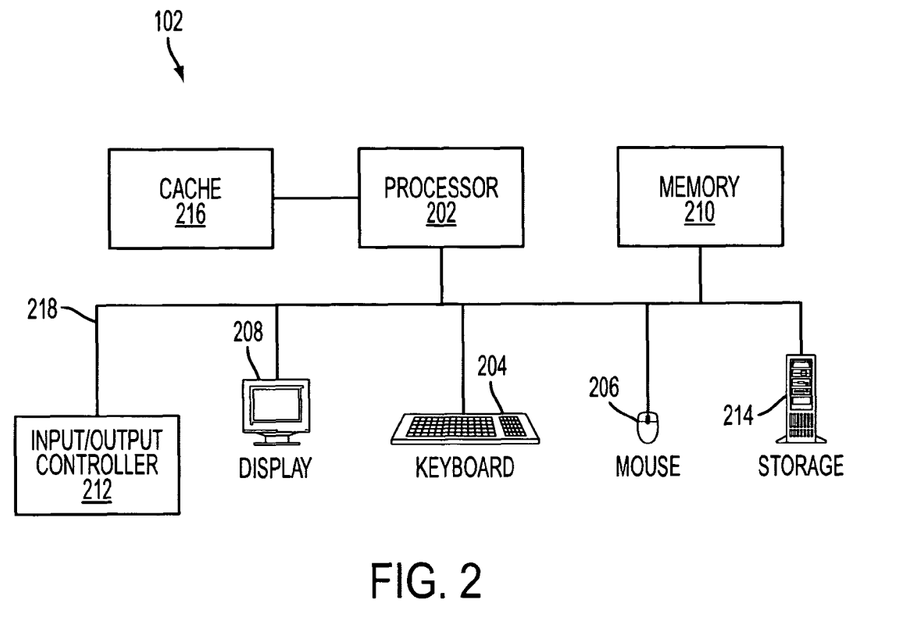
FIG. 2 illustrates an exemplary workstation that is in accordance with embodiments of the present invention.

FIG. 2 illustrates an exemplary workstation 102 that is in accordance with embodiments of the present invention. As shown, workstation 102 may include a central processor 202, a keyboard 204, a pointing device 206 (e.g., mouse, or the like), a display 208, a main memory 210, an input/output controller 212 for coupling workstation 102 to network 108, and a storage device 214. Processor 202 may further include a cache memory 216 for storing frequently accessed information. The various components of the workstation 102 communicate through a system bus 218 or similar architecture.

As noted, workstation 102 may execute various software applications and programs. For example, workstation 102 may include a well known operating system (not shown), such as Linux, Mac OS by Apple Computer, Open VMS, AIX by IBM, Java and Sun Solaris by Sun Microsystems, Windows by Microsoft Corporation, Microsoft Windows CE, Windows NT, Windows 2000, and Windows XP.

In addition, in order to assist in preparing and submitting print jobs, workstation 102 may run various applications, such as a workflow program like FreeFlow™ by the Xerox Corporation. Workflow programs may allow a user of workstation 102 to perform typesetting, page layout, and proofreading. In addition, these workflow programs may allow the user to create, edit, or delete pools of print queues.

Figure 3:
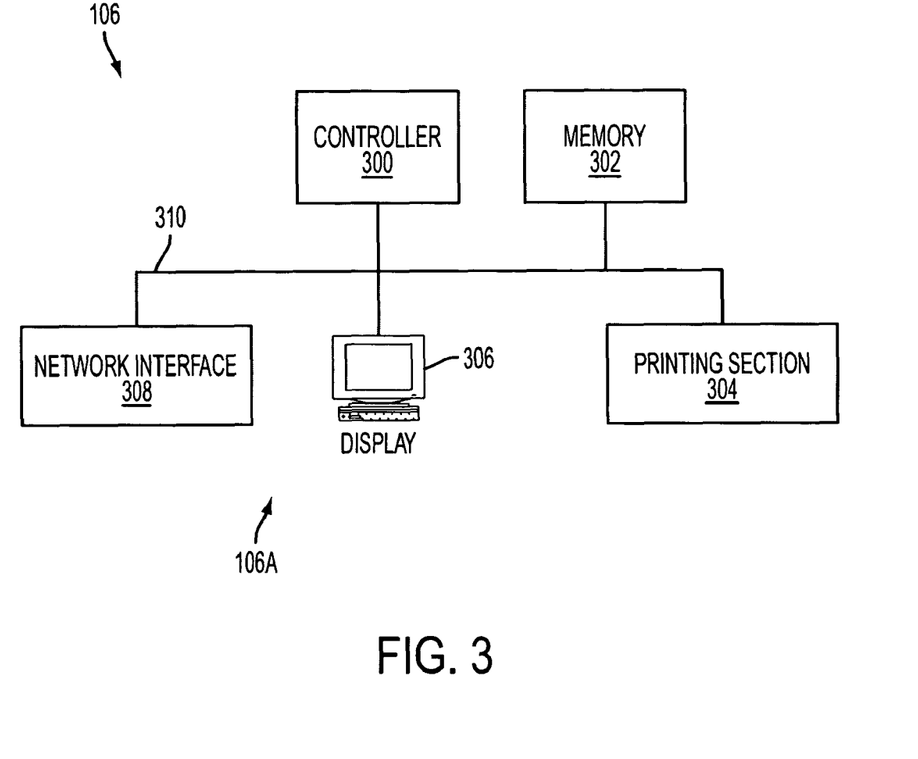
FIG. 3 illustrates an exemplary block diagram of a network printing system that is in accordance with embodiments of the present invention.
Figure 4:
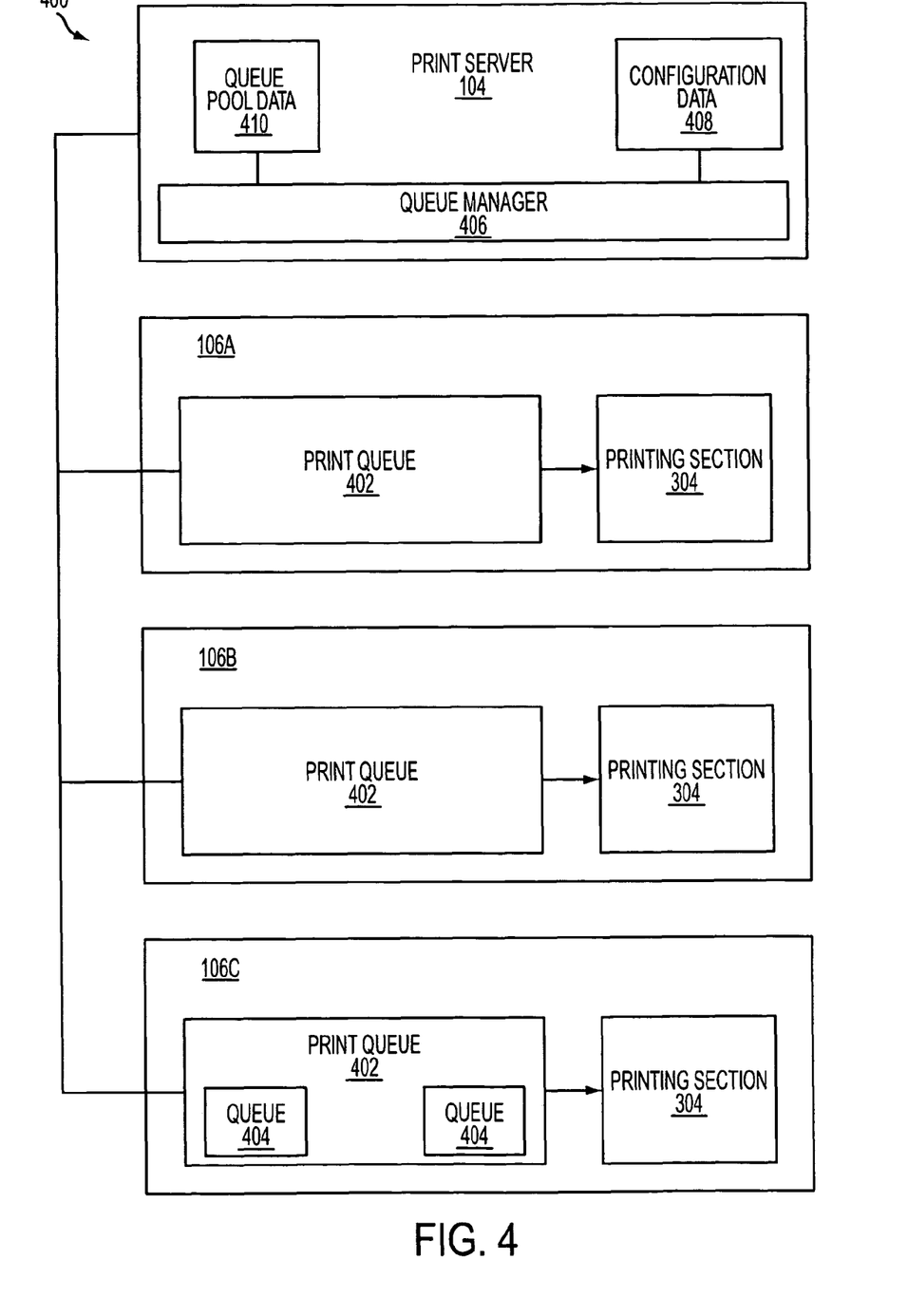
FIG. 4 illustrates an exemplary printing device that is in accordance with embodiments of the present invention.

The following description will provide examples of how multiple print queues may be implemented and synchronized in system 100 with reference now to FIGS. 3-4.

FIG. 3 illustrates an exemplary printing device that is in accordance with embodiments of the present invention. For purposes of illustration, FIG. 3 will be described with reference to printing system 106A. However, the following description may be applicable to printing systems 106B-C and one skilled in the art will recognize that printing systems 106A-C may include any number of well known components of hardware and software.

As shown, printing system 106A may comprise a controller 300, a memory 302, a printing section 304, a display 306, and a network interface 308. These components may be coupled together using a system bus 310 or similar architecture. These components will now be briefly described.

Controller 300 controls the operation of printing system 106A. Controller 300 may be implemented based on well known components of hardware and software. For example, controller 300 may operate the various machine components in printing section 304 in an integrated fashion to produce copies and prints.

In some embodiments, controller 300 may also run an application, such as a digital front end application to provide a user interface and interface application for printing system 106A. For example, controller 300 may provide interface application to allow a user or print server 104 to control and monitor various operator adjustable functions and maintenance activities of printing system 106A, such as the configuration and status of the print queue.

Memory 302 serves as a storage area for printing system 106A. For example, memory 302 can serve as a print queue for printing system 106A. Memory 302 may also provide storage for loading specific programs, such as a digital front end application, diagnostic programs, and storage for data, such as machine history data, fault data, machine physical data, and specific machine identity information. Memory 302 can be implemented using a variety of known components of hardware, software, and firmware. For example, memory 302 can be implemented as a random access memory or using a non-volatile memory. In addition, memory 302 can include other forms of storage, such as a hard disk drive.

Printing section 304 includes the components of hardware and software that are used to print an image onto a hardcopy medium, such as paper, film, etc. For example, printing section 304 can comprise components like those found in a digital color printer, a digital copier, an ink-jet printer, a xerographic printer, or other type of known printing or imaging device. Any type of printing process may be used by printing section 304.

Display 306 provides local display for printing system 106A. For example, display 306 can be a touch screen, or any other suitable control panel that permits control of the operation of printing system 106. Display 306 can be any type of suitable visual display, such as a cathode ray tube display, or flat screen.

Network interface 308 provides a communication interface for printing system 106A. For example, network interface 308 may be modem or network adapter, such as an Ethernet port. Network interface 308 may be implemented using well known components of hardware or software.

FIG. 4 illustrates an exemplary block diagram of a network printing system that is in accordance with embodiments of the present invention. In particular, print server 104 and printing systems 106A-C may collectively implement a network printing system 400 for system 100.

As noted, printing systems 106A-C may implement their own print queues 402, 404 and printing sections 304. In addition, print server 104 may implement a queue manager 406 and use configuration data 408 and queue pool data 410.

Print queues 402, as explained above, provide a queue for their respective printing sections. Print queues 402 may have various configuration settings related to the characteristics the printing system they are coupled to. For example, print queues 402 may support multiple operating systems, multiple drivers, duplex printing settings, color conversion settings, image quality settings, etc. Such configuration parameters are well known to those skilled in the art.

In addition, in some embodiments, a printing system, such as printing system 106C, may comprise one or more queues 404 and each of queues 404 may have synchronized settings for various subsets of print job parameters, such as color management parameters and duplex printing parameters. For example, queues 404 may have the same or equivalent color settings that are kept synchronized with each other. Of course, one skilled in the art will also recognize that a single printing system, such as system 106C, may comprise any number of queues or sub-queues. Multiple queues may also be associated with a single printing system, such as printing systems 106A-C and all or a subset of parameters for these queues may be synchronized with each other in various embodiments of the present invention.

As noted, printing sections 304 for printings systems 106A-C may include the components of hardware and software that are used to print an image onto a hardcopy medium, such as paper, film, etc. For example, printing sections 304 can comprise components like those found in a digital color printer, a digital copier, an ink-jet printer, a xerographic printer, or other type of known printing or imaging device. Any type of printing process may be used by printing sections 304.

Queue manager 406 manages and synchronizes print queues 402, 404. Queue manager 406 may be implemented based on known components of hardware and software. For example, queue manager 406 may be implemented as applications running on print server 104. As another example, queue manager 406 may be a component of an application running on printing systems 106A-C, such as DocuSP by the Xerox Corporation, or as an application running on workstation 102.

In some embodiments, queue manager 406 may manage and synchronize print queues 402, 404 in a variety of ways. For example, in printing systems that keep queue settings of print queue 402 in a file system, such as DocuSP printing systems, then queue manager 406 may synchronize print queues 402 by cascading any changes to these files in a wholesale (or incremental) manner. Other known printing systems may store queue settings in a database, such as a Windows registry. For these types of printing systems, queue manager 406 may cascade changes in an incremental fashion.

Queue manager 406 may group print queues 402 into one or more pools. In addition, queue manager 406 may configure these pools into various types. For example, queue manager 406 may configure pools into a master/slave configuration or into a peer-to-peer configuration.

For master/slave pools, queue manager 406 would designate one of print queues 402 as the master queue, such as print queue 402 at printing system 106A. The settings on the master queue may be fully editable, for example, using a digital front end application (such as those provided by the Xerox Corporation). When the settings are changed on the master queue, queue manager 406 may detect these changes, such as when they are saved at printing system 106A, and may propagate them to the other printing systems in the pool, such as printing system 106B. If a slave, the queue settings for print queue 402 at printing system 106B may be set as read-only. In addition, printing system 106B may advertise or display its status as a slave. Likewise, printing system 106A may advertise or display its status as a master.

For peer-to-peer pools, queue manager 406 may automatically propagate or broadcast changes to any of print queues 402 to all other peers in the pool. In addition, queue manager 406 may allow any peer to initiate and save changes to the pool. In addition, printing systems, such as printing systems 106A-C, in the pool may display or advertise their peers.

Configuration data 408 stores the configuration and queue settings (parameters) of print queues 402. For example, configuration data 408 may indicate items, such as the size of print queues 402, the location of print queues 402, a current status of print queues 402, etc. Configuration data 408 may be formatted based on a wide variety of data structures, which are well known to those skilled in the art. Queue manager 406 may collect configuration data 408 using known techniques. For example, queue manager 406 may scan across network 108 using protocols, such as ZeroConf or simple network management protocol (SNMP), to discover and probe for printing systems 106A-C.

Queue pool data 410 contains information that indicates the available printing systems in system 100, such as printing system 106A-C. In addition, queue pool data 410 may provide information (parameters) about the configuration and status of each pool of queues. For example, queue pool data 410 may include one or more lists of the print queues in each pool. A queue pool may be assigned a name to uniquely identify itself. Queue pool data 410 may also indicate whether a pool is configured in a master/slave or peer-to-peer arrangement. Queue pool data 410 may include information that identifies the printing systems or other devices that are coupled to each print queue. Furthermore, queue pool data 410 may include various timestamp data to track changes and whether they have been fully propagated throughout a queue pool. Of course, one skilled in the art will recognize that queue pool data 410 may be formatted into a variety of data structures, such as one or more tables in a database, and may include various other meta-data about print queues 402.

Figure 5:
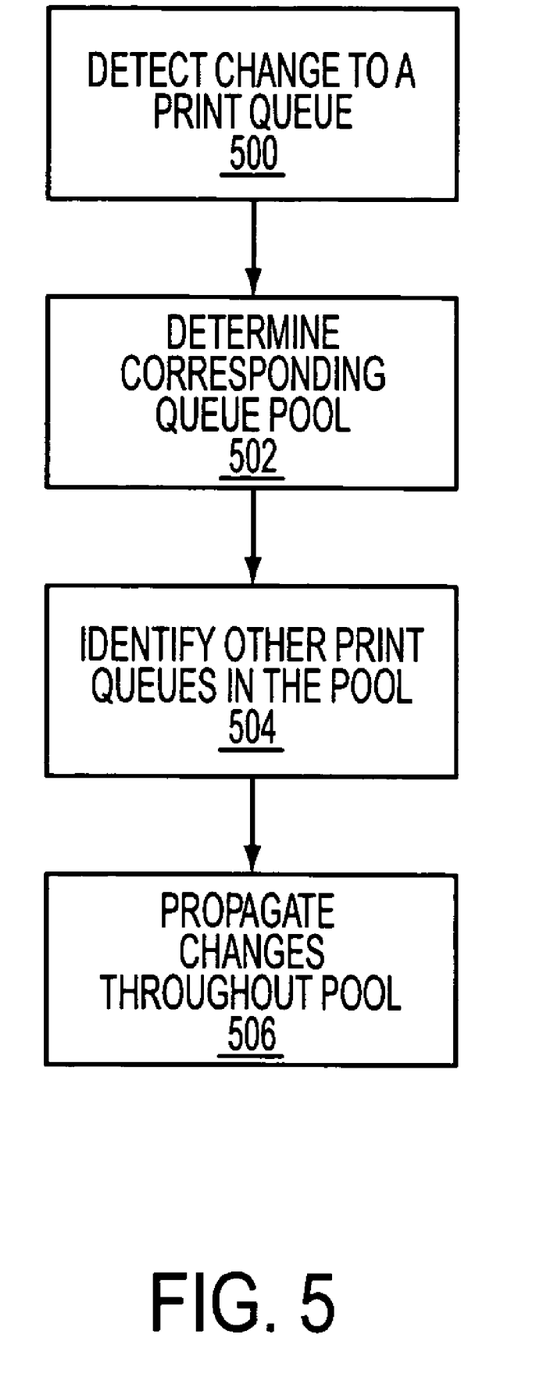
FIG. 5 illustrates an exemplary process flow for synchronizing print queues in accordance with embodiments of the present invention.

FIG. 5 illustrates an exemplary process flow for synchronizing print queues in accordance with embodiments of the present invention. In stage 500, queue manager 406 detects a change to a queue in a queue pool. For example, queue manager 406 may detect a change in print queue 402 at printing system 106A based on period polling or based on an event, such as a user request. Queue manager 406 may detect this change using a known protocol, such as SNMP.

Alternatively, the change may be in response to user action. For example, a user at printing system 106A may manipulate one or more menus on display 306, which affect the settings of print queue 402. In response, controller 300 may then generate one or more messages that are transmitted through network interface 306 back to queue manager 406. One skilled in the art will recognize that changes in any of print queues 402 may be detected in a wide variety of ways. Processing may then flow to stage 502.

In stage 502, queue manager 406 determines which queue pool has been affected by the change. For example, queue manager 406 may query configuration data 408 and queue pool data 410 (alone or in combination) and determine the queue pool assigned. In some embodiments, queue manager 406 may require that a print queue can be a member of only one pool. Of course, one skilled in the art will recognize that a print queue could be a member of multiple pools. For example, a queue can be a member of multiple pools. In addition, subsets of queue settings or information can be members of multiple pools, even pools that are independent of each other. For example, queues 402 may have respective subset queue parameters for items, such as color management settings, paper sizes, and the like. Accordingly, queue manager 406 may determine which queue pool has been affected based on the subset of settings that have been affected by the change. Changes to these subsets of settings may be independent of each other, but queue manager 406 may synchronize these changes across multiple queues in a pool. Processing may then flow to stage 504.

In stage 504, queue manager 406 identifies the other print queues that are a member of the queue pool. For example, queue manager 406 may reference queue pool data 410 and retrieve information for the other print queues indicated in data 410. In those embodiments where a print queue can be a member of multiple pools, queue manager 406 may perform one or more additional operations. For example, queue manager 406 may select one of the pools based on user criteria or a default setting. Alternatively, queue manager 406 may simply identify all the other print queues in the other multiple pools. One skilled in the art will recognize that there are a wide variety of algorithms which queue manager 406 may use to select the other print queues. Processing then flows to stage 506.

In stage 506, queue manager 406 propagates the change to the other print queues in the pool. For example, queue manager 406 may analyze the change and translate the changes into a format recognized by the other print queues. In particular, queue manager 406 may reference configuration data 408 and analyze for differences (if any) between the print queues. For example, queue manager 406 may adjust the change for differences in operating systems, color settings, file system format, etc.

Queue manager 406 may then prepare and transmit one or messages to propagate the change. For example, for printing systems that store queue settings in a file system, queue manager 406 may transmit a replacement file that implements the change in a wholesale fashion. As another example, queue manager 406 may transmit a change message that only includes the change itself. Such a format may be useful for printing systems that use a database structure for its queue settings.

In some embodiments, queue manager 406 may propagate changes in a master/slave environment. That is, queue manager 406 may designate one of print queues 402 as a master. In addition, queue manager 406 may only accept changes to queue settings from the master queue. For example, if print queue 402 of printing system 106A is the master, then queue manager 406 may only recognize changes to queue settings from printing system 106A. Changes from printing system 106B and/or 106C may be ignored or rejected by queue manager 406.

In other embodiments, queue manager 406 may propagate changes in a peer-to-peer environment. That is, queue manager 406 may accept any changes to queue settings from any peer and then may propagate those changes to the other peers.

Figure 6:
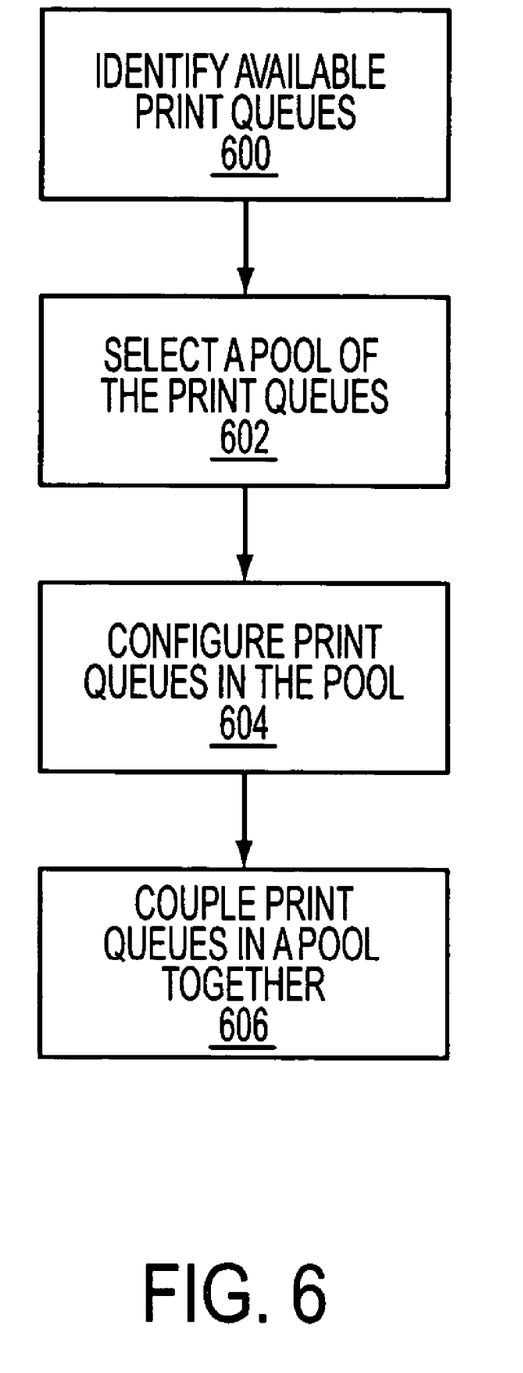
FIG. 6 illustrates an exemplary process flow for configuring a set of print queues in accordance with embodiments of the present invention.

FIG. 6 illustrates an exemplary process flow for configuring a set of print queues in accordance with embodiments of the present invention. Processing may be initiated by a user to create, edit, or delete a pool of print queues. The user may specify a pool type, such as master/slave or peer-to-peer. For master/slave pools, the user may be required to operate from the printing system that hosts or will host the master print queue. For peer-to-peer pools, the user may merely be required to operate from one of the peers in the pool. In some embodiments, a user may configure print queues remotely. For example, a user at workstation 102 may be running an output manager application, such as FreeFlow Output Manager from the Xerox Corporation. In these instances, queue manager 406 may be configured to authenticate the user, but then permit the user to perform any operation on the print queues.

In stage 600, queue manager 406 may identify the print queues that are available in system 100, such as print queues 402. As noted, queue manager 406 may identify print queues using techniques, such as SNMP polling. Queue manager 406 may also identify print queues by searching through configuration data 408 or queue pool data 410 alone or in combination.

The available print queues may then be provided as results in a wide variety of forms. For example, the available print queues may be displayed as a list that is displayed at workstation 102 or at printing systems 106A, 106B or 106C. Processing may then flow to stage 602.

In stage 602, queue manager 406 may then select one or more of print queues 402 for membership into a pool. For example, a user at workstation 102 or printing systems 106A-C may indicate one or more print queues 402 for membership into a pool.

As noted, the user may be presented one or more lists that indicate the print queues available. In some embodiments, a print queue may be restricted to a single pool, and thus, the list may indicate print queues that already are members of a pool in some form. For example, these print queues may be displayed in a different color or grayed out. The user may indicate selections based on input with a keyboard, mouse, or similar mechanism.

When creating a pool, the user may further be prompted to provide a name for the pool. If the user is also editing or deleting a pool, the user may submit a query or browse through a list of the pools. Once the user has completed the intended operations, processing may then flow to stage 604.

In stage 604, queue manager 406 may configure each of the selected print queues in a pool. In particular, queue manager 406 may analyze the respective settings of each of the print queues selected and determine an equivalent or common set of settings. For example, queue manager 406 may reference configuration data 408 and determine the various settings across different print queues that are equivalent. Such information may be provided from the respective manufactures of hardware and software employed in printing systems 106A-C and stored in configuration data 408. In addition, this information may also be collected from other sources, such as third party vendors or from other users. Processing may then flow to stage 606.

In stage 606, queue manager 406 may couple each print queue in the pool to ensure that any changes to the equivalent set of settings are propagated throughout the pool. For example, queue manager 406 transmit the equivalent set of settings to printing systems 106A-C in the form of a file or other data structure, such as extensible markup language data. In addition, queue manager 406 may provide a list of all members in the pool to each printing system in the pool. Once each printing system recognizes the other members of the pool they may couple to each other, for example, by establishing various communications, such as for polling for changes and other status information. In some embodiments, at each printing system, a user may be able to determine the status of that printing system (i.e., master/slave, or peer), view the queue settings, and may see a listing of all the print queues in the pool.

For master/slave pools, queue manager 406 may notify each printing system whether they are hosting the master queue or a slave queue. The printing system hosting the master queue may be configured to allow changes to the equivalent set of settings. Meanwhile, the printing systems hosting slave queues may be configured such that their queue settings are restricted to read-only access. Any changes originating from these printing systems may be ignored or rejected. In addition, the slave printing systems may also be configured to automatically accept and implement any changes originated from the master queue. For peer-to-peer pools, queue manager 406 may configure each member of the pool to acknowledge and accept changes from each other.

In some embodiments, queue manager 406 may propagate changes such that they take effect immediately. Of course, queue manager 406 may also be configured to schedule the implementation of changes based on a variety of factors.

It will be apparent to those skilled in the art that various modifications and variations can be made to the embodiments of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method of synchronizing print queues, the method comprising:
   detecting a change in at least one setting of a first queue associated with a printing device capable of printing a print job, wherein the first queue is configured to queue print jobs of the printing device;
   determining a queue pool comprising the first queue that is affected by the change;
   identifying at least one additional queue in the queue pool, the at least one additional queue associated with an additional printing device capable of printing a print job;
   designating the first queue as a master queue of the queue pool and the at least one additional queue as a slave queue;
   analyzing configuration data of the at least one additional queue to determine a difference between the first queue and the at least one additional queue, wherein the configuration data comprises a set of printer settings of the additional printing device, and wherein the set of printer settings comprises at least one of operating systems support settings, driver support settings, duplex printing settings, color conversion settings, or image quality settings;
   translating the change, based on the difference, into a format recognized by the at least one additional queue; and
   propagating the translated change to the at least one additional queue, wherein the translated change is propagated from the first queue.

2. The method of claim 1, wherein the at least one setting is a queue pool data parameter.

3. The method of claim 1, wherein the at least one setting is a configuration data parameter.

4. The method of claim 1, further comprising: detecting an additional change to the at least one additional queue; and propagating the additional change to the first queue.

5. An apparatus for synchronizing print queues, the apparatus comprising: means for detecting a change in at least one setting of a first queue associated with a printing device capable of printing a print job, wherein the first queue is configured to queue print jobs of the printing device; means for determining a queue pool comprising the first queue that is affected by the change; means for identifying at least one additional queue in the queue pool, the at least one additional queue associated with an additional printing device capable of printing a print job; means for designating the first queue as a master queue of the queue pool and the at least one additional queue as a slave queue; means for analyzing configuration data of the at least one additional queue to determine a difference between the first queue and the at least one additional queue, wherein the configuration data comprises a set of printer settings of the additional printing device, and wherein the set of printer settings comprises at least one of operating systems support settings, driver support settings, duplex printing settings, color conversion settings, or image quality settings; means for translating the change, based on the difference, into a format recognized by the at least one additional queue; and means for propagating the translated change to the at least one additional queue, wherein the translated change is propagated from the first queue.

6. A non-transitory computer readable storage medium comprising program code to cause a computer to perform the method of: detecting a change in at least one setting of a first queue associated with a printing device capable of printing a print job, wherein the first queue is configured to queue print jobs of the printing device; determining a queue pool comprising the first queue that is affected by the change; identifying at least one additional queue in the queue pool, the at least one additional queue associated with an additional printing device capable of printing a print job; designating the first queue as a master queue of the queue pool and the at least one additional queue as a slave queue; analyzing configuration data of the at least one additional queue to determine a difference between the first queue and the at least one additional queue, wherein the configuration data comprises a set of printer settings of the additional printing device, and wherein the set of printer settings comprises at least one of operating systems support settings, driver support settings, duplex printing settings, color conversion settings, or image quality settings; translating the change, based on the difference, into a format recognized by the at least one additional queue; and propagating the translated change to the at least one additional queue, wherein the translated change is propagated from the first queue.

* * * * *